United States Patent [19]
Mynott et al.

[11] Patent Number: 4,715,647
[45] Date of Patent: Dec. 29, 1987

[54] FRAMELESS TURN-UP REAR WINDOW FOR VEHICLES

[75] Inventors: Ralph Mynott, Nuenen; Johan Verbeek, Eindhoven, both of Netherlands

[73] Assignee: 501 Volvo Car B.V., Helmond, Netherlands

[21] Appl. No.: 916,912

[22] Filed: Oct. 9, 1986

[30] Foreign Application Priority Data

Oct. 10, 1985 [NL] Netherlands ............... 8502761

[51] Int. Cl.$^4$ ............................................. B60J 1/18
[52] U.S. Cl. ................................ 296/152; 296/84.C; 296/201
[58] Field of Search ............... 296/201, 84 R, 84 B, 296/84 C, 76, 146, 152

[56] References Cited
U.S. PATENT DOCUMENTS 4,626,087  12/1986  Ohyama ..................... 296/84 B

FOREIGN PATENT DOCUMENTS

| | | |
|---|---|---|
| 2555195 | 4/1980 | Fed. Rep. of Germany . |
| 3245710 | 11/1983 | Fed. Rep. of Germany . |
| 2225606 | 11/1974 | France . |
| 2548600 | 1/1985 | France . |
| 1065055 | 4/1967 | United Kingdom . |
| 2079827 | 1/1982 | United Kingdom ........... 296/201 |
| 2152124 | 7/1985 | United Kingdom . |

OTHER PUBLICATIONS

Patent Abstracts of Japan, vol. 9, No. 168, 7/13/85.

*Primary Examiner*—Robert R. Song
*Attorney, Agent, or Firm*—Pennie & Edmonds

[57] ABSTRACT

A frameless turn-up rear window for vehicles, wherein at some distance from its outer edge a metallic profile strip has been fixed all round by cementing onto the inside of the window, which strip has an open side facing the interior of the vehicle and is provided with means of attachment for one or more of those ancillary parts which are commonly used for the proper functioning of the rear window.

9 Claims, 2 Drawing Figures

FRAMELESS TURN-UP REAR WINDOW FOR VEHICLES

The invention relates to a frameless turn-up rear window for vehicles such as motor cars. Also, the invention relates to vehicles, especially motor cars, provided with such a rear window.

Until a few years ago a turn-up rear window for vehicles, especially motor cars, invariably consisted of a metal plate containing an aperture for the insertion of a window. The metal frame enclosing the aperture was invariably wide and therefore well suited for the attachment thereto of those parts which are required or desirable for the proper functioning of the rear window and the motor car. Parts worth mentioning in this context include the hinges, a handle, a wiper motor, springs such as, for instance, gas-filled springs and a lock.

The broad-rimmed frame enclosing the aperture obviously limited the rearward view and rendered the construction heavy. In an attempt to improve this situation, so-called frameless turn-up rear windows have been proposed. In essence, these windows consist of a whole pane of some transparent material, for instance glass, laminated glass or plastc, whose rims match up with a sealing edge provided on the motor-car body. Such a sealing edge could indeed be fitted on the rim of the window, but this is mostly undesirable, because an edge on the body can at the same time serve for the discharge of rain water. From the outset, these frameless rear windows posed the problem to what the various parts as mentioned hereinbefore were to be attached. The use of sturdy materials for the rear window made it possible to fasten those parts directly, for instance with bolts and nuts, to the window. In actual practice, however, such designs frequently proved to cause trouble, for instance cracking of the pane, because all parts were in contact with the glass and forces arising from the operation of the parts were therefore transferred to the glass.

It is an object of the present invention to obviate the aforesaid drawbacks and to procure still other advantages.

A frameless turn-up rear window for vehicles according to the invention is characterized in that at some distance from its outer edge a metallic profile strip has been fixed all round by cementing onto the inside of the window, which strip has an open side facing the interior of the vehicle and is provided with means of attachment for one or more of those ancillary parts which are customary for the proper functioning of the rear window.

With the advent of various types of glue, for instance two-component glues of superior quality it is nowadays possible to bring about an absolutely reliable and lasting bond between metal, for instance aluminium, and glass, laminated glass or plastic. The profile strip as applied according to the invention can therefore absorb all forces exerted thereon by such parts as, for instance, the hinges, the handle, the wiper motor and the lock. Inasmuch as the strip is profiled and applied all round on the pane, a reinforcement of the entire window is obtained at the same time. By "all round" is meant that the strip runs parallel to the outer edge of the window along its entire circumference. The profile may have any arbitrary shape, but preferably a simple channel type is chosen which is cemented with one closed side onto the window.

The hinges, the gas-filled springs and the lock may be positioned completely on the inside. It is otherwise with the wiper and the handle. The wiper motor may be fitted on the inside to the profile strip, but a connection between the motor and the wiper blade is required, necessitating a hole in the window for a shaft to pass through. In a preferred embodiment of the present invention this hole is made sufficiently large that there is no contact between the window and the shaft of the wiper motor. Thus, forces exerted by the wiper blade are not transferred directly to the glass but passed on to the motor and hence to the profile strip to which the motor is attached.

A similar problem occurs with the fixing of the handle. It is solved in the same fashion in that the means of attachment which establish the connection between the external handle and the profile strip pass through holes in the window of such width that there is no contact between the window and these means of attachment.

In a preferred embodiment of the invention, the holes are provided with means for achieving a watertight sealing.

The use of a profiled strip, in particular a U-shaped strip according to the invention, also presents a specific advantage in that wiring can be inserted into the channel of the strip for the supply of power to those parts which must be operated electrically such as, for instance, the wiper motor, the rear window heating and an electrically controlled lock. The open side of the profile strip is preferably provided with a covering strip, for instance in plastic. This strip may be shaped such that it can be compressed into the profile and easily taken out again for repairs, if any, to the wiring.

The invention will now be elucidated with reference to the drawings, in which.

Figure 1:
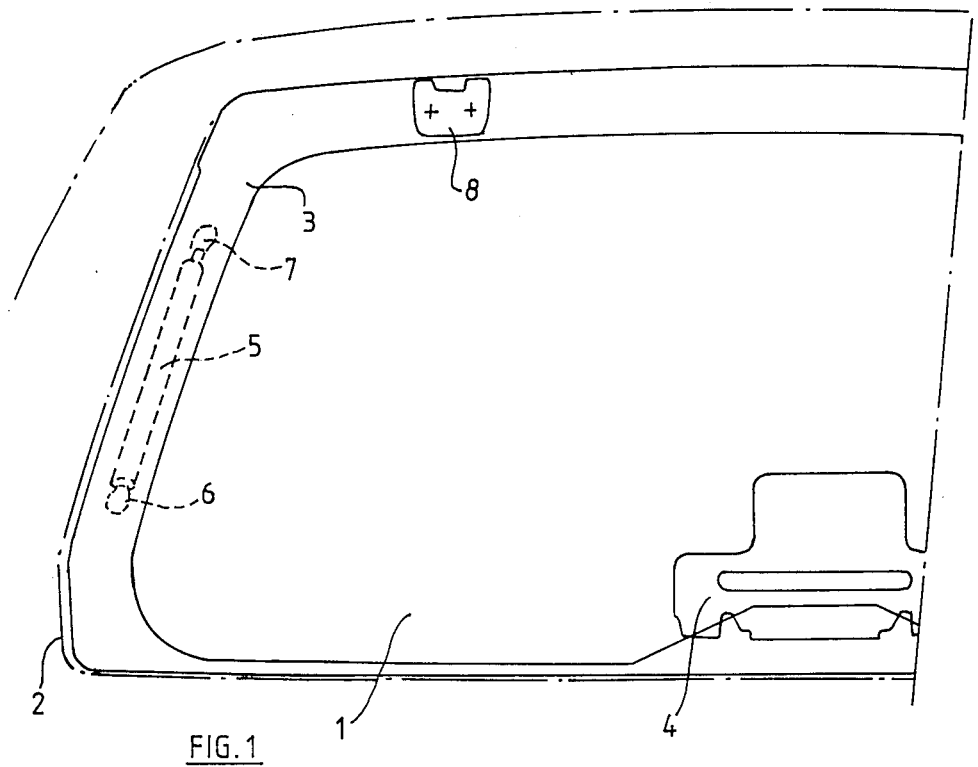
FIG. 1 represents part of a rear window according to the invention.

In FIG. 1, the window 1 matches up along its edge 2 with a sealing edge provided on the motor car body. On the window 1 the U-shaped profile 3 has been fitted by cementing with, for instance, polyurethane glue. A fastening plate 4 for the wiper motor and a handle has been attached to the profile 3. A gas-filled spring 5 has been fitted at 6 to the profile 3 and at 7 to a part of the body. Also attached to the profile strip 3 is a hinge 8.

Figure 2:
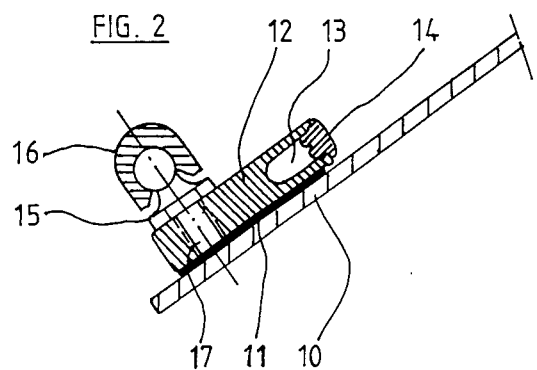
FIG. 2 is a sectional view at the point of attachment of a gas-filled spring.

In FIG. 2, the window 10 carries the profile strip 12 which has been glued on by means of the adhesive coat 11. The profile strip encloses a more or less U-shaped cavity 13, which is sealed off by a plastic covering strip 14. A member 15 is provided for the attachment of the gas-filled spring 16. The member 15 has been screwed into the profile 12 at 17 and has a knob at the other end which imparts the necessary freedom of movement to the gas-filled spring 16. Inside the cavity 13, a multiple cable may be accommodated for the power supply of the wiper motor, the rear window heating, a lock, and the like.

We claim:

1. A frameless turn-up rear window for vehicles, characterized in that at some distance from its outer edge a U-shaped metallic profile strip has been fixed all round by cementing onto the inside of the window, which strip has an open side facing the interior of the vehicle and is provided with means of attachment for one or more of those ancillary parts which are commonly used for the proper functioning of the rear window.

2. A frameless turn-up rear window according to claim 1, provided on the outside with a handle for opening and closing the rear window, characterized in that the means of attachment of the handle to the profile strip pass through holes in the window of such width that there is no contact between the window and these means of attachment.

3. A frameless turn-up rear window according to claim 1 or 2, provided on the inside with a wiper motor, characterized in that this motor is supported by the profile strip and that the shaft carrying the wiper blade on the outside passes through a hole in the window of such width that there is no contact between the window and this shaft.

4. A frameless turn-up rear window according to claim 3, characterized in that the holes are provided with means for achieving a watertight sealing.

5. A frameless turn-up rear window according to claim 4, characterized in that the channel of the profile strip accommodates wiring for the supply of power to those parts fitted on the rear window which must be operated electrically.

6. A frameless turn-up rear window according to claim 5, characterized in that the open side of the profile strip carries a covering strip.

7. A frameless turn-up rear window according to claim 6, characterized in that the profile strip has been made in aluminum.

8. A vehicle, especially a motor car, provided with a frameless turn-up rear window according to claim 7.

9. A frameless turn-up rear window for vehicles, characterized in that at some distance from its outer edge a metallic strip has been fixed all round by cementing onto the inside of the window, which strip is at least in part of its cross section U-shaped, the open side of the U-shaped portion facing the interior of the vehicle and is provided with means of attachment of one or more of those ancillary parts which are commonly used for the proper functioning of the rear window.

* * * * *

UNITED STATES PATENT AND TRADEMARK OFFICE
CERTIFICATE OF CORRECTION

PATENT NO. : 4,715,647

DATED : December 29, 1987

INVENTOR(S) : Ralph Mynott and Johan Verbeek

It is certified that error appears in the above-identified patent and that said Letters Patent is hereby corrected as shown below:

Title Page at [73] Assignee: "501 Volvo Car B.V." should read -- Volvo Car B.V. --

Signed and Sealed this

Twelfth Day of July, 1988

*Attest:*

DONALD J. QUIGG

*Attesting Officer*    *Commissioner of Patents and Trademarks*